March 5, 1957 C. R. SKARIN ET AL 2,783,720
BAKING OVEN
Filed Sept. 21, 1953 2 Sheets-Sheet 1
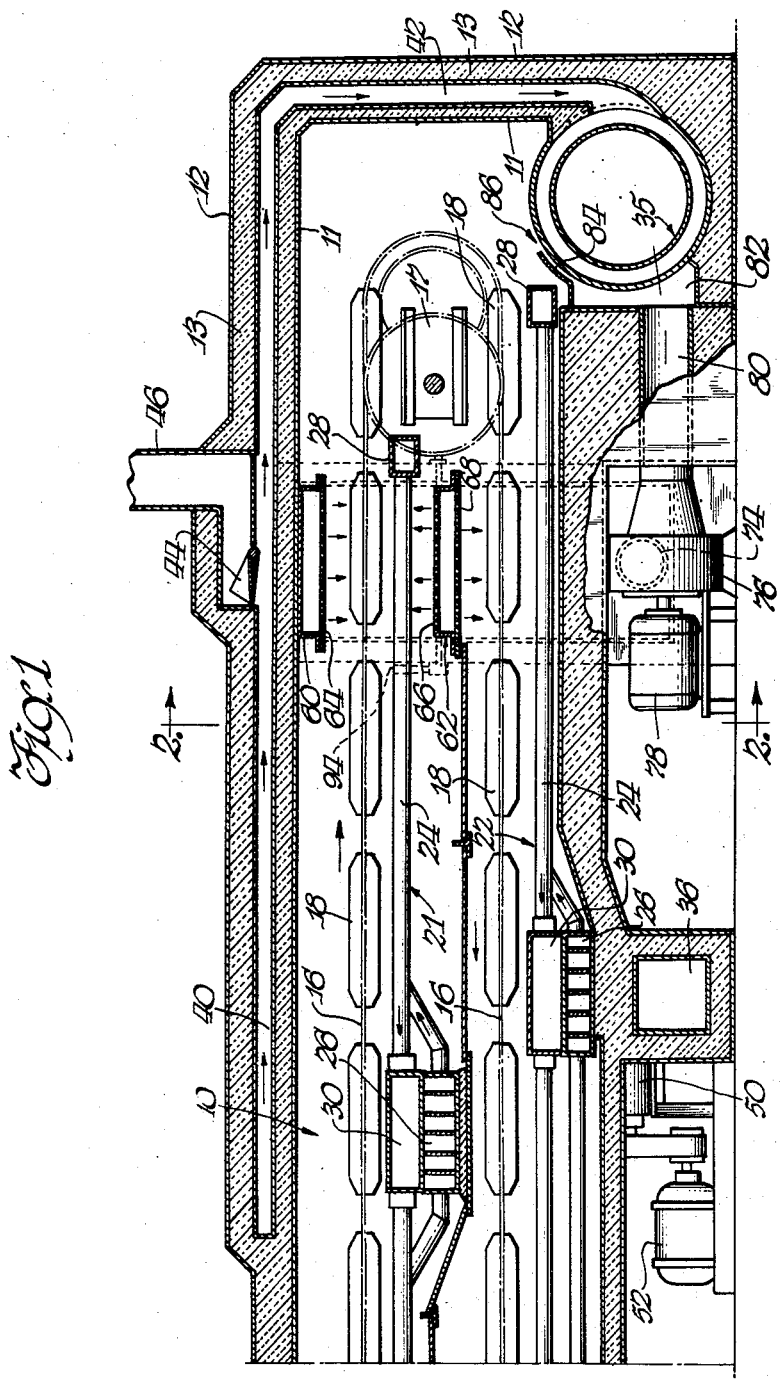
Inventors
Carl Richard Skarin
Wallace W. Wittenberger
by Bair, Freeman & Molinare
Attys.

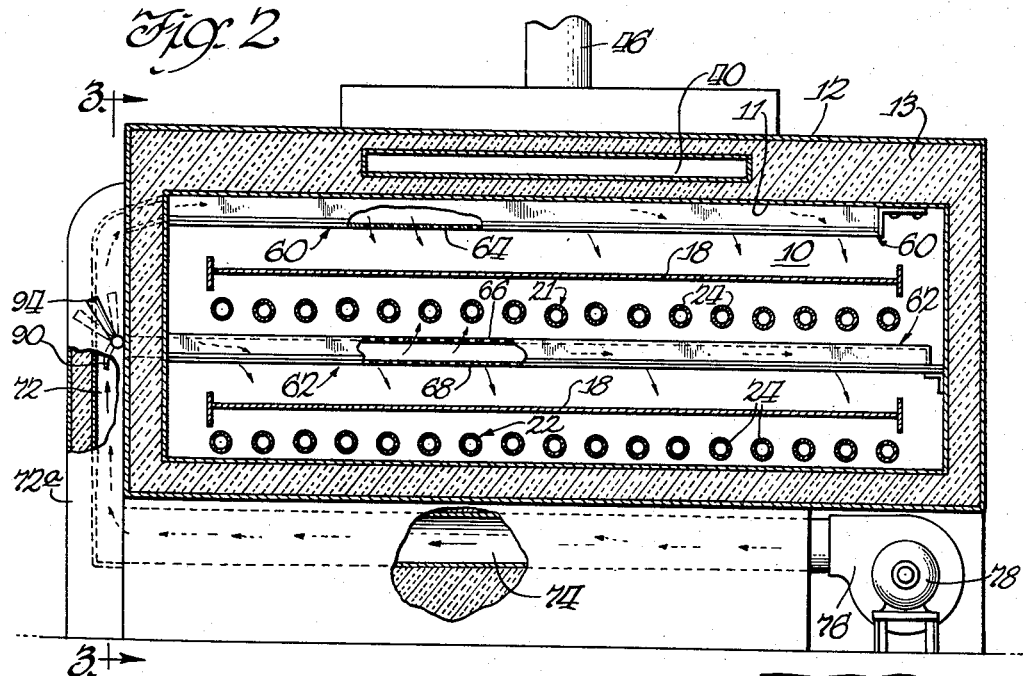

United States Patent Office 2,783,720
Patented Mar. 5, 1957

2,783,720

BAKING OVEN

Carl R. Skarin, Western Springs, and Wallace W. Wittenberger, Elmhurst, Ill., assignors to The Petersen Oven Company, Franklin Park, Ill., a corporation of Illinois Application September 21, 1953, Serial No. 381,166

4 Claims. (Cl. 107—63)

This invention relates to improvements in baking ovens of the commercial type wherein the baking chamber is indirectly heated and wherein foodstuffs, such as loaves of bread, are continuously moved by a conveyor through the baking chamber for baking of the foodstuffs.

The present invention represents certain novel and important improvements over the baking oven construction disclosed in United States Letters Patent No. 2,236,085, dated March 25, 1941, assigned to applicants' assignee. The oven construction disclosed in said patent includes an arrangement of apparatus by virtue of which the heated air and gases in the baking chamber are agitated for effecting a more uniform distribution of heat throughout the chamber, and thereby assists in obtaining more uniform baking, coloring or browning of loaves of bread or the like without producing undesirable characteristics in the crust portion of the baked foodstuffs.

It has been found that mere agitation of the heated air and gases in the baking chamber is insufficient to insure producing properly baked, top quality foodstuffs, particularly when foodstuffs of different compositions are employed, or when various baking characteristics depend upon the nature and/or type of foodstuffs being baked. For example, if it is desired to bake foodstuffs at a high rate of production, the radiators or heat exchangers must necessarily be at a higher temperature and which results in providing a hotter bottom baking action, and the top portion is baked to a lesser degree than the bottom. Similarly, when the foodstuffs are being baked at a lower rate of production, there is a tendency to bake the foodstuffs too lightly at their bottom portion. Similar difficulties are also experienced in endeavoring to obtain properly baked foodstuffs in such ovens when there are variations in the nature and/or type of the foodstuffs being baked.

One of the objects of this invention is to provide novel apparatus wherein proper baking, together with browning and/or coloring of the foodstuffs is attainable, irrespective of the different rates of production that may be employed for baking of the foodstuffs, as well as variations in the nature or type of the foodstuffs being baked.

Another object is to provide improved apparatus of the character indicated, which efficiently agitates the heated air and gases in the baking chamber and directs streams of heated air and gases into direct contact with the foodstuffs in a manner so as to insure proper distribution of heat and for effecting uniform baking and coloring or browning of the foodstuffs.

A further object is to provide a novel construction and arrangement of apparatus which provides for selectively discharging heated air and gases in either an upwardly direction or a downwardly direction, or in both upwardly and downwardly directions, into direct contact with the foodstuffs being moved through the baking chamber in the process of being baked.

Still another object is to provide novel apparatus of the character indicated, wherein suction-blower means is provided for withdrawing of heated air and gases from a zone of close proximity to the fuel burner of the oven and by virtue of which such withdrawn air and gases are heated and are ejected into the oven chamber in a direction substantially normal to the path of travel of the foodstuffs being conveyed through the baking chamber.

A still further object of this invention is to provide improved apparatus of the character indicated which is inexpensive to manufacture, durable and economical in use, and which may be selectively adjusted so as to cause proper agitation of the air and gases in the baking chamber and for directing heated air and gases in the baking chamber into direct contact with the foodstuffs being conveyed through the baking chamber so as to insure obtaining proper baking characteristics of the foodstuffs in relation to the particular nature and/or type thereof.

Other objects and advantages of this invention will be apparent from the following description, taken in connection with the accompanying drawings, in which:

Figure 1 is a fragmentary, longitudinal, vertical section through a baking oven, provided with apparatus embodying the present invention.

Figure 2 is a transverse sectional view through the oven, taken substantially as indicated at lines 2—2 on Figure 1.

Figure 3 is a fragmentary view, partly in section and partly in elevation, taken substantially as indicated at lines 3—3 on Figure 2.

Figure 4 is an enlarged, fragmentary, vertical section, taken substantially as indicated at lines 4—4 on Figure 3.

The baking oven, as illustrated in the drawings, is of a generally rectangular, elongated shape and of rather low height, and includes a baking chamber 10 surrounded by a housing, the walls of which are composed of two spaced apart inner and outer sheets of metal, as indicated at 11 and 12, between which suitable heat insulated material, indicated at 13, is interposed.

In Figure 1 of the drawings, only the rearward portion of the oven is represented. It is to be understood, however, that the front portion of the oven (not shown) is of a conventional form, including a suitable opening through which bread or other foodstuffs is introduced into the baking chamber and through which the baked foodstuff is removed therefrom.

Within the baking chamber 10 is an endless conveyor of conventional form, shown diagrammatically. The conveyor includes two transversely spaced apart sets of suitable chains 16, which are trained at their opposite ends around pairs of spaced apart sprocket wheels 17. Pivotally suspended from the chains in a manner as diagrammatically represented in United States Letters Patent Nos. 2,235,476 and 2,289,629, dated March 18, 1941, and July 14, 1942, respectively, at suitably spaced apart intervals throughout the length of the chains, are trays 18, adapted to receive and support thereon pans containing bread or other foodstuffs, during their course of travel through the baking chamber. The conveyor travels in a substantially horizontal direction, providing upper and lower runs. As may be seen by the direction of travel, indicated by arrows in Figure 1 of the drawings, the foodstuffs to be baked are placed on the trays on the upper run of the conveyor at the forward end of the oven, and at the rear end of the baking chamber the trays supporting the foodstuff are maintained in substantially horizontal position in their movement around the sprocket wheels until they move onto the lower run of the conveyor. At all times the foodstuffs supported on the trays of the conveyor remain in substantially horizontal position.

Located directly beneath the upper run of the conveyor is a heat exchanger or radiator 21, and located immediately below the lower run of the conveyor is a heat exchanger or radiator 22. Each of these radiators include two sets of longitudinally extending, transversely spaced apart flues or conduits 24, and one set of the flues are connected at one end to hot air inlet ducts 26, and their opposite ends open into headers 28. The other set of flues have one end in open communication with said headers while their opposite end opens into an outlet duct 30. Located at the extreme rear end portion of the baking chamber is a heater 35, preferably of gas or fluid fuel operated type, from which heated air and gases are directly fed into a main conduit 36, by a connecting duct, not shown, and the heated air and gases are then fed through the inlet ducts 26, into the radiators. The heated air and gases give up substantial portions of their heat energy in the radiators, and are exhausted through the outlet ducts 30, which, in turn, are in communication by ducts, not shown, with a top duct 40, formed in the top wall of the oven, and which communicates at its rear end with a vertical duct 42, in the rear end wall of the oven, and the latter opening opening directly into the heater 35. By virtue of this construction, the heated air and gases employed for heating the baking chamber 10 are maintained in a closed system and are continuously recirculated, with the exception of a small portion of said heated air which is permitted to be discharged through a spill damper 44, which is in open communication with a stack 46; it being understood, of course, that a certain amount of fresh air is continuously admitted to the system. The heated air and gases are forcibly moved through the heating system by a suitable blower indicated at 50, driven by an electric motor 52. Such circulatory systems are well known in the art, and generally similar systems are disclosed in the two above identified United States Letters Patent Nos. 2,235,476 and 2,289,629.

Referring now more specifically to the present invention, there is provided in the baking chamber 10, depending upon the length thereof, one or more sets of nozzles through which streams or jets of heated air and gases are directed toward the foodstuffs as they are moved along by the conveyor. As seen in Figure 1 of the drawings, one set of nozzles is shown adjacent the rear end of the baking chamber. As shown, there is provided an upper nozzle, indicated generally at 60, located immediately above the upper run of the conveyor, and a lower nozzle 62 located immediately above the lower run of said conveyor. These nozzles are of boxlike form, preferably made of sheet metal, and extend substantially the entire width of the baking chamber, as seen in Figure 2 of the drawings. In the case of the upper nozzle 60, there is provided at the bottom, a head plate 64 which is perforated substantially throughout its entire area, and through which perforations streams or jets of heated air and gases are projected in a down-draft, upon and substantially normal to the path of travel of foodstuffs supported upon the trays of the conveyor. The nozzle 62 is formed with a pair of head plates 66 and 68, forming top and bottom walls respectively, which likewise are perforated substantially throughout their entire area, and by virtue of which streams or jets of heated air and gases are projected in both up-draft and down-draft directions with respect to the foodstuffs being moved along the runs of the conveyor. It will be noted that the head plate 66 is so positioned that the heated air is discharged through and around the flues 24 of the heat exchanger 21, and into contact with the bottoms of the foodstuffs being supported upon the trays 18 of the upper run of the conveyor. The lower head plate 68 of the nozzle 62 permits heated air and gases to be directed in a down-draft, directly upon the foodstuffs supported upon the trays on the lower run of the conveyor.

Ovens of the type herein disclosed are usually constructed and arranged so that the conveyor is arrested intermittently so as to align one of the trays with the loading and unloading opening at the front end of the oven, to permit introduction of foodstuffs to be baked and/or removal of baked foodstuffs from the oven. Accordingly, we prefer that the width of the nozzles, in the direction corresponding to the path of travel of the conveyor, be at least equal to a corresponding dimension of the trays 18, so as to make certain of eliminating the possibility of dark and light spots in the crust of the baked foodstuff as might otherwise occur incident to such intermittent stoppage of the conveyor.

Direct extensions at corresponding ends of the two nozzles 60 and 62, extend through the side wall of the oven and are in direct communication with a vertical duct 72, as seen in Figures 2, 3 and 4 of the drawings. The lower end of the vertical duct 72 is in communication with a horizontally extending duct 74, which in turn connects into the housing of a suction-blower apparatus 76 which is driven by an electric motor 78. The suction-blower apparatus is connected at its inlet side to a horizontal duct 80 which opens into a chamber 82, surrounding a portion of the heater 35. A plate 84, forming the upper portion of the chamber 82, has a portion disposed in close proximity to the outer shell of the heater and defines therewith an elongated, relatively narrow opening 86, through which the heated air and gases within the baking chamber are withdrawn into substantially direct contact with the outer shell of the heater 35, for increasing the temperature of such air and gases and which, in turn, through the suction-blower 76, are forcibly directed through the duct system for discharge through the nozzles 60 and/or 62.

As is well known, ovens of the type herein disclosed are frequently employed for baking of different types of foodstuffs and foodstuffs which require being subjected to various baking characteristics. While it is highly desirable, and beneficial results flow from the provision of nozzles for effecting agitation of the heated air and gases in the baking chamber, such, in and of itself, is insufficient to provide the necessary flexibility required within the baking chamber of such an oven so as to always insure proper baking operations being performed upon various types of baked foodstuffs, for example, breads of different types or characteristics. Accordingly, we provide an arrangement by virtue of which heated air and gases are forcibly injected into selective zones of the baking chamber into direct contact with the foodstuffs on the conveyor.

As seen in Figures 2, 3 and 4 of the drawings, a damper indicated at 90, is mounted in the vertical duct 72, in cooperative relation to both the transverse dimension of the duct 72, as well as the inlet opening of the lower nozzle 62. The damper is supported on a transverse rod or shaft 92, having extensions journalled in side walls of the duct 72a, at opposite ends of said duct, and the outer end of one of the extensions of the shaft 92 is provided with a handle 94. By operating the handle and by the provision of suitable friction or detent means (not shown), the damper may be moved to and maintained at any one of three main positions of adjustment, as indicated at A, B and C in Figure 4 of the drawings. When the damper is in the full-line position, indicated at A, the heated air and gases are free to flow through both the nozzles 62 and 60 respectively. When it is desired, in order to obtain certain baking characteristics in the oven, the damper through movement of the handle 94 may be adjusted to position C, which closes off the lower nozzle 62 so that the heated air and gases are caused to flow only into and be discharged downwardly from the nozzle 60, so that the heated air and gases impinge directly upon the foodstuffs being carried only upon the upper run of the conveyor. Heated air being blown downwardly on the foodstuffs increases the heat at the top of the foodstuffs. When it is desired to condition the baking chamber for baking of different type of foodstuffs, the damper, through the movement of the handle 94, may be adjusted to position B, which closes off the upper portion of the duct 72, as well as the nozzle 60, so that the heated air and gases are only permitted to flow into and be discharged in both upwardly and downwardly directions through the nozzle 62. In this latter case, heated air is discharged upwardly against the underside of the foodstuffs being carried upon the upper run of the conveyor and tends to balance the temperature all around the foodstuff, and heated air is also directed downwardly to impinge directly upon the top of the foodstuffs on the lower run of the conveyor, which tends to increase the temperature at the upper portion of the foodstuffs. When the damper is adjusted in the full-line position, as indicated at A, heated air and gases are discharged through both the nozzles 60 and 62.

By virtue of this construction, the operator is afforded a substantial amount of flexibility so as to permit selectively directing heated currents of air and gases with respect to the foodstuffs being baked, and thus insure obtaining the desired baking characteristics compatible with the nature and/or type of the foodstuff being baked. Furthermore, by virtue of such an arrangement, it is possible to obtain a more balanced temperature around the foodstuffs, and thereby obtain more uniform baking, as well as uniform browning and/or coloring of the foodstuffs being baked. For normal or medium rates of production, the damper is preferably adjusted to the full-line position, as indicated at A in Figure 4, so that heated air and gases are discharged in both upwardly and downwardly directions, substantially normal with respect to the foodstuffs being moved through the baking chamber on the conveyor and thereby obtain uniform baking and coloring and/or browning of the foodstuffs being baked.

Although we have herein shown and described a preferred embodiment of our invention, manifestly it is capable of modification and rearrangement without departing from the spirit and scope thereof. We do not, therefore, wish to be understood as limiting this invention to the precise embodiment herein disclosed, except as we may be so limited by the appended claims.

We claim:

1. The combination with a baking oven having a baking chamber, a tray conveyor positioned in the chamber and having substantially horizontal upper and lower runs for conveying foodstuffs through the chamber in the process of baking, and means comprising a substantially closed system for indirectly heating said chamber; of power actuated suction-blower apparatus having outlet and inlet ducts, the outlet duct having a pair of discharge nozzles extending transversely of the chamber and positioned above and in close proximity to each of the respective runs of the conveyor, said nozzles having a multiplicity of orifices facing downwardly, substantially normal to the path of travel of said runs of the conveyor, the inlet duct having an opening in direct communication with the lower portion of the chamber, and in direct communication with the external wall of said heating means, whereby heated air and gases are withdrawn from the lower portion of the chamber into direct heating contact with the external wall of said heating means, independently of said closed system, and forcibly discharged downwardly toward both of said runs of the conveyor into direct contact with the foodstuffs carried on said runs.

2. The combination with a baking oven having a baking chamber, a tray conveyor positioned in the chamber and having substantially horizontal upper and lower runs for conveying foodstuffs through the chamber in the process of baking, and means comprising a substantially closed system for indirectly heating said chamber; of power actuated suction-blower apparatus having outlet and inlet ducts, the outlet duct having a pair of discharge nozzles extending transversely of the chamber and positioned above and in close proximity to each of the respective runs of the conveyor, said nozzles having a multiplicity of orifices facing downwardly, substantially normal to the path of travel of said runs of the conveyor, the inlet duct having an opening in direct communication with the lower portion of the chamber, and in direct communication with the external wall of said heating means, whereby heated air and gases are withdrawn from the lower portion of the chamber into direct heating contact with the external wall of said heating means, independently of said closed system, and forcibly discharged downwardly toward both of said runs of the conveyor into direct contact with the foodstuffs carried on said runs, and means associated with said outlet duct for selectively discharging said heated air and gases through either or both of said nozzles.

3. The combination with a baking oven having a baking chamber, a tray conveyor positioned in the chamber and having substantially horizontal upper and lower runs for conveying foodstuffs through the chamber in the process of baking, and means for indirectly heating said chamber; of power actuated suction-blower apparatus having outlet and inlet ducts, the outlet duct having a pair of discharge nozzles extending transversely of the chamber and positioned above and in close proximity to each of the respective runs of the conveyor, each of said nozzles having a multiplicity of orifices facing downwardly, substantially normal to the path of travel of said runs, the nozzle positioned above the lower run also having a multiplicity of orifices facing upwardly, substantially normal to the path of travel of the upper run, the inlet duct having an opening in direct communication with the lower portion of the chamber, in close proximity to said heating means, whereby heated air and gases are withdrawn from the lower portion of the chamber and forcibly discharged in two opposing streams in a direction substantially normal to the path of travel of the upper run of the conveyor and in a separate downwardly directed stream, substantially normal to the lower run of the conveyor, into direct contact respectively with the top and bottom of the foodstuffs on the upper run of the conveyor and into direct contact with the top of the foodstuffs on the lower run of the conveyor.

4. The combination with a baking oven having a baking chamber, a tray conveyor positioned in the chamber and having substantially horizontal upper and lower runs for conveying foodstuffs through the chamber in the process of baking, and means for indirectly heating said chamber; of power actuated suction-blower apparatus having outlet and inlet ducts, the outlet duct having a pair of discharge nozzles extending transversely of the chamber and positioned above and in close proximity to each of the respective runs of the conveyor, each of said nozzles having a multiplicity of orifices facing downwardly, substantially normal to the path of travel of said runs, the nozzle positioned above the lower run also having a multiplicity of orifices facing upwardly, substantially normal to the path of travel of the upper run, the inlet duct having an opening in direct communication with the lower portion of the chamber, in close proximity to said heating means, whereby heated air and gases are withdrawn from the lower portion of the chamber and forcibly discharged in two opposing streams in a direction substantially normal to the path of travel of the upper run of the conveyor and in a separate downwardly directed stream, substantially normal to the lower run of the conveyor, into direct contact respectively with the top and bottom of the foodstuffs on the upper run of the conveyor and into direct contact with the top of the foodstuffs on the lower run of the conveyor, and manually operable damper means associated with said outlet duct for selectively discharging heated air and gases through both or either of said pair of nozzles of the outlet duct.

References Cited in the file of this patent

UNITED STATES PATENTS

| | | |
|---|---|---|
| 2,022,976 | Byron | May 28, 1935 |
| 2,236,085 | Cook | Mar. 25, 1941 |
| 2,286,049 | Baker | June 9, 1942 |
| 2,289,629 | Cook | July 14, 1942 |
| 2,604,059 | Warrington | July 22, 1952 |